United States Patent
Woo

(10) Patent No.: US 8,830,177 B2
(45) Date of Patent: Sep. 9, 2014

(54) METHOD AND APPARATUS FOR DISPLAYING VIEW MODE USING FACE RECOGNITION

(75) Inventor: Sang Wook Woo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 101 days.

(21) Appl. No.: 13/544,280

(22) Filed: Jul. 9, 2012

(65) Prior Publication Data

US 2013/0009867 A1 Jan. 10, 2013

(30) Foreign Application Priority Data

Jul. 7, 2011 (KR) .................. 10-2011-0067183

(51) Int. Cl.
*G09G 5/00* (2006.01)

(52) U.S. Cl.
USPC ............. 345/169; 345/156; 348/333.12

(58) Field of Classification Search
CPC ....... G06F 3/016; G06F 3/017; G06F 3/0416; G06F 3/04883; G06F 3/0425
USPC .......................... 345/169, 173, 156
See application file for complete search history.

(56) References Cited

U.S. PATENT DOCUMENTS

| | | |
|---|---|---|
| 2004/0252913 A1 | 12/2004 | Ahn |
| 2008/0239131 A1* | 10/2008 | Thorn ............... 348/333.01 |
| 2009/0239579 A1 | 9/2009 | Lee et al. |
| 2009/0295832 A1 | 12/2009 | Takatsuka et al. |
| 2012/0057064 A1* | 3/2012 | Gardiner et al. ........ 348/333.12 |

FOREIGN PATENT DOCUMENTS

| | | |
|---|---|---|
| JP | 2009-294728 A | 12/2009 |
| KR | 10-2004-0107890 A | 12/2004 |
| KR | 10-2009-0101733 A | 9/2009 |

* cited by examiner

*Primary Examiner* — Duc Dinh
(74) *Attorney, Agent, or Firm* — Jefferson IP Law, LLP

(57) ABSTRACT

A method for displaying screen data according to determination of a view mode in a portable terminal, and an apparatus thereof, are provided. The method includes detecting an orientation change event of the portable terminal in a displayed state of the screen data, turning-on a camera module when the orientation change event is detected, determining an orientation of eyes of a user through face detection from an image captured by the camera module, determining a view mode of the portable terminal according to an orientation of the portable terminal and the orientation of the eyes of the user, and displaying screen data according to the determined view mode.

14 Claims, 8 Drawing Sheets

METHOD AND APPARATUS FOR DISPLAYING VIEW MODE USING FACE RECOGNITION

PRIORITY

This application claims the benefit under 35 U.S.C. §119(a) of a Korean patent application filed on Jul. 7, 2011 in the Korean Intellectual Property Office and assigned Ser. No. 10-2011-0067183, the entire disclosure of which is hereby incorporated by reference.

BACKGROUND OF THE INVENTION

1. Field of the Invention

The present invention relates to a portable terminal and a method for performing a function thereof. More particularly, the present invention relates to a method for displaying in a view mode using face recognition that may recognize an orientation of the eyes of a user using a face recognition function, and for automatically changing a view mode of the portable terminal based on the orientation of the eyes of the user to control the display of screen data thereof, and an apparatus thereof.

2. Description of the Related Art

With development of digital technology, a portable terminal such as a Personal Digital Assistant (PDA), an electronic organizer, a smart phone, a tablet Personal Computer (PC), etc., which are capable of processing communication and private information have been variously provided. The portable terminal has evolved to include various functions such as an image call, an electronic organizer function, a document function, an e-mail function, an Internet function, a voice call, and a Short Message Service (SMS) transmission function.

The portable terminal is continuously developing according to technological advancements and the needs of the user. In particular, a recent portable terminal supports a function that allows the user to rotate and use a screen in a horizontal or vertical orientation. Accordingly, corresponding screen data is set to be displayed in a horizontal or vertical orientation according to a type of screen data displayed on a screen. In this case, the screen data refers to various data displayed on a screen of the portable terminal, and may include dynamic images, still images, texts, menus, icons, application execution data, etc. To do this, the portable terminal includes a sensor (e.g., a gyro sensor) for detecting orientation information of the portable terminal, and changes a view mode of a screen based on a gravity direction detected by the sensor.

Further, a method of the related art for changing a view mode considers only an absolute direction of gravity without considering an orientation of the user. Accordingly, when a screen is automatically rotated based on only the sensor, if the eyes of the user are vertically aligned as the user lies horizontally, the eyes of the user disagrees with the view mode of the portable terminal that was set based on only the sensor such that the user cannot use the screen as it is. That is, although the user wants to display screen data suited to the orientation of the eyes of the user regardless of the orientation of the portable terminal, the user has to adapt their viewing orientation and view the screen data displayed according to the orientation of the portable terminal.

To address the foregoing problems, there has been proposed an approach that manually sets on/off an automatic view mode rotation. However, in the foregoing approach, when an automatic rotation function is turned-off, for example, to enter a horizontal view mode, the user should turn-on an automatic rotation function to enter in a horizontal view mode, wait for a change to another horizontal view, and then turn-off the automatic rotation function.

SUMMARY OF THE INVENTION

Aspects of the present invention are to address at least the above-mentioned problems and/or disadvantages and to provide at least the advantages described below. Accordingly, an aspect of the present invention is to provide a method that may automatically change a view mode suited to an orientation of the eyes of a user and accordingly display screen data, and an apparatus thereof.

Another aspect of the present invention is to provide a method for determining horizontal/vertical orientation of a portable terminal according to an orientation of two eyes of the user and automatically changing a view mode of a portable terminal suited to the orientation of the eyes of the user when a view mode by a detector disagrees with the orientation of the eyes of the user, and an apparatus thereof.

Another aspect of the present invention is to provide a method for changing a screen view mode in a portable terminal in consideration of a gravity direction and an orientation of the eyes of the user so as to optimize a view mode, and minimizing inconvenience to the user, and an apparatus thereof.

Another aspect of the present invention is to provide a method for displaying a view mode of a portable terminal for implementing an optimal environment for supporting a function for automatically changing a view mode according to a change of orientation of the portable terminal to improve convenience to a user, utilization and competitive force of a portable terminal, and an apparatus thereof.

In accordance with an aspect of the present invention, a method for displaying screen data according to determination of a view mode in a portable terminal is provided. The method includes detecting an orientation change event of the portable terminal in a displayed state of the screen data, turning-on a camera module when the orientation change event is detected, determining an orientation of eyes of a user through face detection from an image captured by the camera module, determining a view mode of the portable terminal according to an orientation of the portable terminal and the orientation of the eyes of the user, and displaying screen data according to the determined view mode.

In accordance with another aspect of the present invention, at least one non-transitory computer readable recording medium for storing a program commands configured to be readable by readable by at least one processor for instructing the at least one processor to execute a computer process for performing the above recited method is provided.

In accordance with another aspect of the present invention, a portable terminal is provided. The portable terminal includes an orientation detector for detecting a change in orientation of the portable terminal and providing a corresponding orientation change event, a camera module turned-on when the orientation change event occurs for capturing a user image, a display unit for displaying screen data of the portable terminal in one of a landscape view mode and a transverse view mode, a memory for storing a current view mode created during an operation of a view mode of the portable terminal and detection information, and a controller for controlling the camera module to turn-on when the orientation change event is detected in a displayed state of the screen data, for detecting a user face from an image captured by the camera module, for determining a view mode corresponding to an orientation of the eyes of the user determined by the face detection, and for controlling to display the screen data on the display unit according to the determined view mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
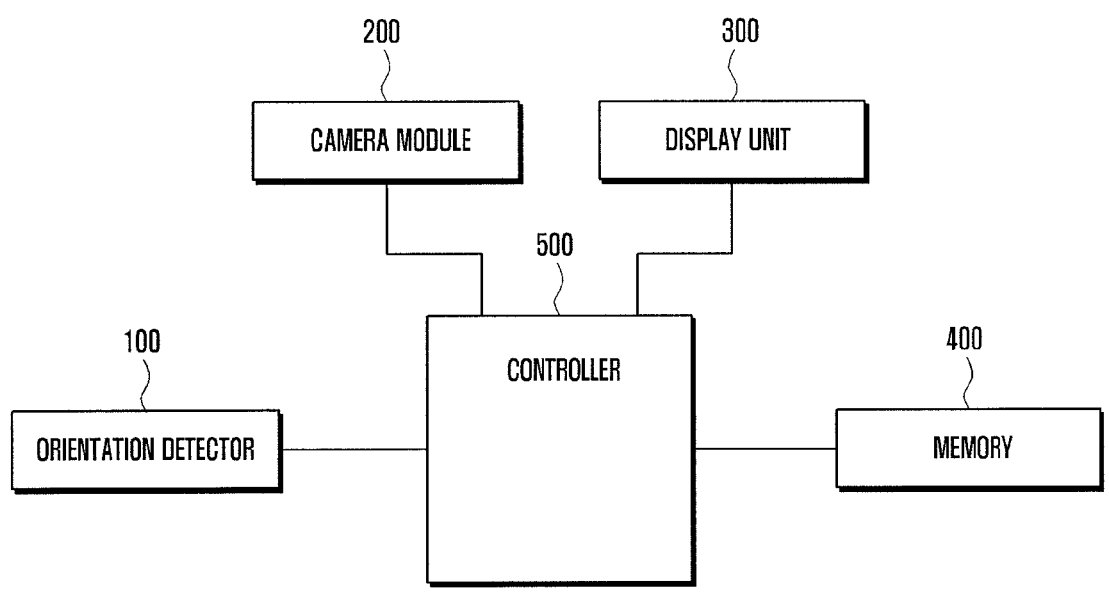
FIG. 1 is a block diagram illustrating a configuration of a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention include a view mode determining method using face recognition, and a method and an apparatus for displaying screen data according thereto that may automatically change a screen view mode in a portable terminal in consideration of a gravity direction and an orientation of the eyes of the user so as to minimize inconvenience to the user. For example, in an exemplary embodiment of the present invention, when the user lies horizontally and views the portable terminal such that the portable terminal is horizontally orientated, a display unit of the portable terminal is maintained in a transverse mode suited to the orientation of the eyes of the user without being changed to a landscape mode, and the landscape mode and the transverse mode may be automatically changed according to an orientation of the eyes of the user without changing settings.

In an exemplary embodiment of the present invention, when a change in the orientation of the portable terminal is detected by an orientation detector, a camera module of the portable terminal is turned-on and face recognition may be performed using images captured by the camera module. Further, an orientation of the eyes of the user (e.g., horizontal or vertical orientation) according to locations of the two eyes of the user may be determined through face recognition. Next, a view mode detected by the orientation detector is compared with the orientation of the eyes of the user. A view mode of the portable terminal corresponding to the orientation of the eyes of the user is determined according to results of the comparison so as to control the display of screen data according to the determined view mode.

In an exemplary embodiment of the present invention, the screen data refers to various data displayed on a screen of the portable terminal, and may include at least one of moving images, still images, texts, menus, icons, various data provided on a screen of a display unit, etc. Further, in an exemplary embodiment of the present invention, the orientation detector detects a change of orientation of the portable terminal, and may include at least one of a gyro sensor, an acceleration sensor, a magnetic field sensor. etc.

A configuration of a portable terminal and an operation control method thereof according to exemplary embodiments of the present invention will be described below with reference to the drawings. However, a configuration of a portable terminal and a control method thereof according to exemplary embodiments of the present invention is not limited to following contents but are applicable to other various exemplary embodiments based on the following exemplary embodiments.

Figure 2:
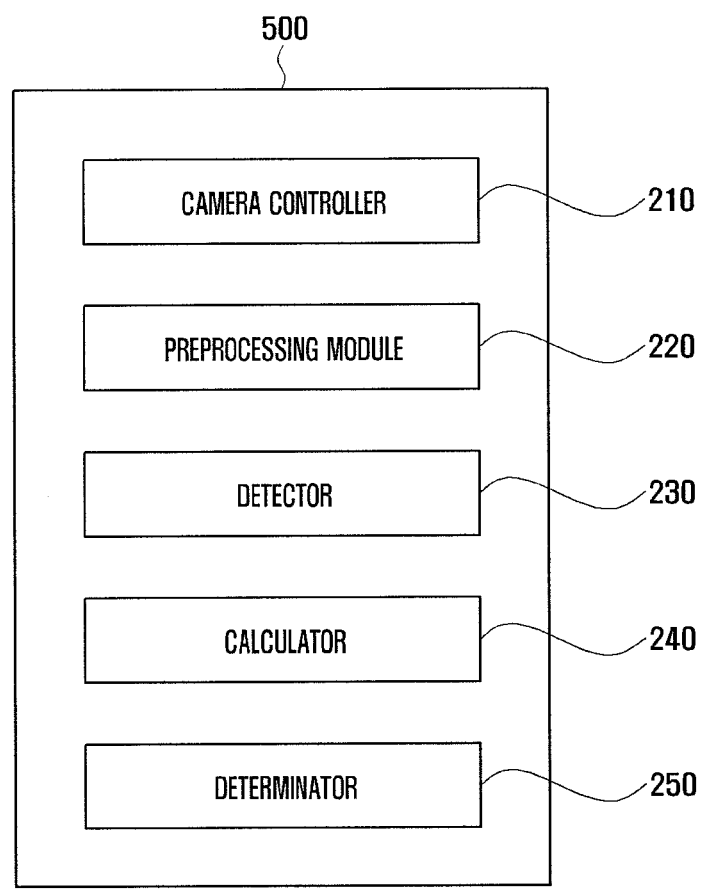
FIG. 2 is a block diagram schematically illustrating a configuration of a controller according to an exemplary embodiment of the present invention.

FIG. 1 is a block diagram illustrating a configuration of a portable terminal according to an exemplary embodiment of the present invention. FIG. 2 is a block diagram schematically illustrating a configuration of a controller according to an exemplary embodiment of the present invention.

Referring to FIG. 1, a portable terminal of an exemplary embodiment of the present invention includes an orientation detector 100, a camera module 200, a display unit 300, a memory 400, and a controller 500. Besides these components, a portable terminal of an exemplary embodiment of the present invention may include one or more of an audio processor with a microphone and a speaker, a digital broadcasting module for receiving digital broadcasting (e.g., mobile broadcasting such as Digital Multimedia Broadcasting (DMB) or Digital Video Broadcasting (DVB)), at least one near distance communication module such as Bluetooth communication, Infrared Data Association (IrDA) communication, Radio Frequency Identification (RFID) communication, and Near Field Communication (NFC) for supporting a communication function based on near distance wireless communication, a radio frequency (RF) module for supporting a communication function based on mobile communication, a touch pad and a touch screen for supporting touch based input, an input unit for supporting physical key input, a battery for supplying power to the foregoing elements, etc.

The orientation detector 100 detects a change in orientation of the portable terminal and transfers a corresponding electric signal (referred to as an 'orientation change event' hereinafter) to the controller 500. In an exemplary embodiment of the present invention, when the display unit 300 is turned-on to display predetermined screen data under the control of the controller 500, power is supplied to the orientation detector 100 and the orientation detector 100 may detect a change in orientation of the portable terminal. In an exemplary embodiment of the present invention, the orientation detector 100 always operates to detect a change in orientation of the portable terminal. In an exemplary embodiment of the present invention, the orientation detector 100 may include at least one device among sensing devices of various forms that may detect a change in orientation of the portable terminal. For example, the orientation detector 100 may include at least one of an acceleration sensor, a gyro sensor, etc.

The camera module 200 photographs a subject and transfers a photographed image to at least one of the display unit 300 and the controller 500. In an exemplary embodiment of the present invention, when the controller 500 detects an orientation change event of the portable terminal via the orientation detector 100, power is supplied to the camera module 200 such that it is turned-on. When the camera module 200 is turned-on, the camera module 200 may transfer a preview image of the subject (e.g., a face of the user) to the controller 500. In this case, when the camera module 200 is turned-on due to the orientation change event, the preview image may be internally processed and not displayed on the display unit 300. Further, in an exemplary embodiment of the present invention, the camera module 200 may include two camera modules, one provided at a front surface (i.e., the same surface the display unit 300 is provided on) and another one provided at a rear surface of the portable terminal. In this case, in the exemplary embodiment of the present invention, the camera module provided at a front surface of the portable terminal may be used.

The display unit 300 may display an operation state of the portable terminal and screen data associated with performing an operation thereof. For example, the display unit 300 may display various execution screen data of one or more functions supported by the portable terminal and applications such as a home screen of the portable terminal, screen data according to playback of media files (e.g., audio files, moving image files, still image files, etc.), game screen data according to the execution of a game, etc. Further, in an exemplary embodiment of the present invention, a Liquid Crystal Display (LCD) may be used as the display unit 300. However, other display devices such as a Light Emitting Diode (LED), an Organic LED (OLED), or an Active Matrix OLED (AMOLED) may be used. Further, when the display unit 300 displays an execution screen, it may provide a landscape view mode or a transverse view mode according to an orientation of the portable terminal. Further, the display unit 300 may include an interface supporting touch based input. For example, the display unit 300 may support a touch based on user interaction input by a touch screen arrangement and create and transfer an input signal according to the user interaction to the controller 500.

The memory 400 stores various programs and data executed and processed in the user device, and may be configured by at least one of nonvolatile memory and volatile memory. In an exemplary embodiment of the present invention, the nonvolatile memory may be a Read Only Memory (ROM), or a flash memory, and the volatile memory may be a Random Access Memory (RAM). Further, the memory 400 may continuously or temporarily store an operating system of the user device, programs and data associated with a display control operation of the display unit 300, programs and data associated with an input control operation using the display unit 300, and programs and data associated with a data sharing function control operation of the user device. In particular, the memory 400 may temporarily store a current view mode and detection information created during a view mode operation to be described below.

The controller 500 controls overall operations of the portable terminal. In particular, the controller 500 may control operations associated with a view mode function operation using face recognition as described herein. For example, when an orientation change event of the portable terminal is detected by the orientation detector 100 in a displayed state of screen data, the controller 500 may control the camera module 200 to turn-on. In an exemplary embodiment of the present invention, the orientation change event indicates an event where an orientation of the portable terminal changes from an initial orientation to another orientation such as from a horizontal orientation to a vertical orientation or from the vertical orientation to the horizontal orientation with respect to a front surface (e.g., a state where eyes of the user are facing the display unit 300) of the portable terminal while the portable terminal displays screen data.

The controller 500 may detect a face from an image captured by the camera module 200, and determine a view mode from a result according to the face detection. For example, the controller 500 may recognize locations of the eyes of the user to determine an orientation of the eyes of the user. The controller 500 may then determine an agreement or disagreement of the gravity direction with respect to the orientation of eyes of the user. The controller 500 may then determine a view mode corresponding to an orientation of the eyes of the user. Further, the controller 500 may rotate and display or maintain and display currently displayed screen data according to the determined view mode.

The controller 500 of an exemplary embodiment of the present invention may include a camera controller 210, a preprocessing module 220, a detector 230, a calculator 240, and a determinater 250.

The camera controller 210 controls turning-on of the camera module 200 according to an orientation change event detected by the orientation detector 100. When a view mode is determined, the camera controller 210 may control turning-off of the camera module 200.

The preprocessing module 220 may control a first compensation (e.g., a scheme for reducing frame rate to increase exposure) with respect to a preview image of the camera module 200 when an image (e.g., a preview image) input through the camera module 200 is dark. When the image is dark after the first compensation, the preprocessing module 220 obtains an average value using a histogram and compares the image with the obtained average value. Next, the preprocessing module 220 may control a second compensation for adding a predetermined value to one or more pixels of the image that have less than the average value so as to compensate the brightness. The second compensation will be described below.

For example, in a case of an YCbCr (where Y indicates luminance (i.e., an amount of light) and Cb/Cr indicates chrominance) format, the preprocessing module 220 may analyze a histogram with respect to a Y (i.e., luminance) value to calculate an average value of the histogram, and increase the Y (i.e., luminance) value based on the calculated average value by a predetermined value (e.g., α). This may be expressed by equation 1 as follows.

$$\text{If}(Y\text{pixel}) > \text{MEAN Histogram of entire screen})\text{then}$$
$$(Y\text{pixel}=Y\text{pixel}+\alpha) \quad (1)$$

In equation 1, the Y indicates luminance, and the MEAN indicates an average brightness of an entire screen.

The detector 230 may detect a face from an image captured by the camera module 200. The detector 230 may detect the face using a preprocessed image as described above. In an exemplary embodiment of the present invention, the detector 230 may detect a color of the face, and locations of eyes and lips based on technologies such as facial recognition, iris scan, lariat feature tracking, etc.

The calculator 240 may temporarily store detection information (e.g., locations of eyes) according to the face detection. Further, the calculator 240 may recognize locations of the eyes of the user according to the face detection, and determine a reference view mode according to the eyes of the user by comparing a connection line of the recognized two eyes of the user with a reference line (e.g., horizontal line corresponding to the orientation of the portable terminal). For example, when the locations of the eyes of the user are detected, the calculator 240 compares a connection line of the two eyes of the user with a reference line based on a horizontal line corresponding to the orientation of the portable terminal. When an angle (slope) of the connection line is less than a reference angle (e.g., 45°), the calculator 240 determines a current view mode as a reference view mode. The calculator 240 compares a connection line of the two eyes of the user with a reference line based on a horizontal line corresponding to the orientation of the portable terminal. When an angle (slope) of the connection line is equal to or greater than a reference angle (e.g., 45°, the calculator 240 may change a current view mode and determine the changed view mode as a reference view mode.

The determinater 250 compares the determined reference view mode with a temporarily stored current view mode. The determinater 250 may maintain a current view mode or determine to change the view mode by creating a rotation event according to a comparison between the determined reference view mode and the temporarily stored current view mode.

A control operation of the controller 500 will be described below in the context of an example of an operation of a portable terminal and a control method thereof with reference to the drawings. The controller 500 may control various operations associated with typical functions of the portable terminal in addition to the foregoing function. For example, when a certain application is performed, the controller 500 may control an operation of the application and screen display. Further, the controller 500 may receive an input signal corresponding to various input schemes supported from a touch based input interface and a corresponding function operation. Further, the controller 500 may control transmission and reception of various data based on wired or wireless communication.

Figure 3:
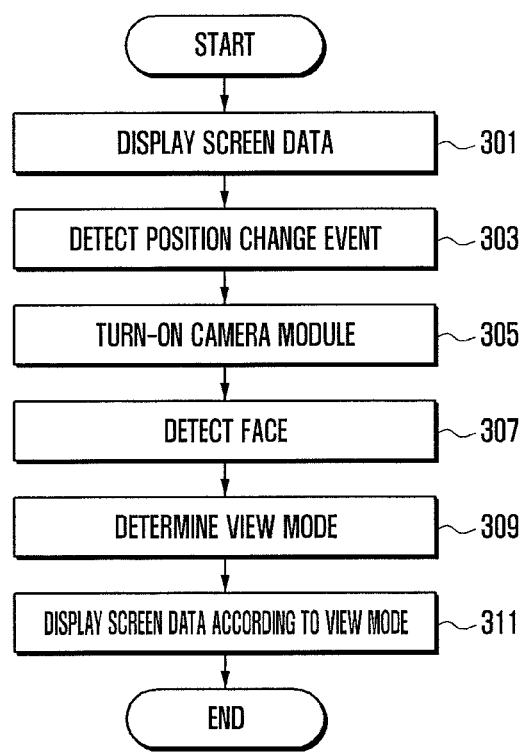
FIG. 3 is a flowchart illustrating a view mode operation method in a portable terminal according to an exemplary embodiment of the present invention.

FIG. 3 is a flowchart illustrating a view mode operation method in a portable terminal according to an exemplary embodiment of the present invention.

Referring to FIG. 3, the controller 500 may control the display of screen data in step 301. For example, the controller 500 may control the display of screen data such as execution screen data, home screen, and a menu of an application according to a user selection.

Next, the controller 500 may detect an orientation change event of the portable terminal in a displayed state of the screen data in step 303. In an exemplary embodiment of the present invention, the orientation change event indicates an event where an orientation of the portable terminal changes from an initial orientation to another orientation such as from a horizontal orientation to a vertical orientation or from the vertical orientation to the horizontal orientation based on a front surface (e.g., a state where eyes of the user are located in the same line as the display unit 300) of the portable terminal while the portable terminal displays screen data. Further, in an exemplary embodiment of the present invention, the orientation change event is detected by the orientation detector 100 and the detected orientation change event may be transferred to the controller 500. That is, the controller 500 may recognize a change in a gravity direction detected by the orientation detector 100.

When the orientation change event is detected, the controller 500 may control the camera module 200 to turn-on in step 305. In this case, the controller 500 checks a state of the camera module 200. When the camera module 200 is turned-off, the controller 500 may turn-on the camera module 200. Further, when the portable terminal of an exemplary embodiment of the present invention includes a camera module at a front surface and a rear surface thereof, the controller 500 may control the camera module provided at a front surface of the portable terminal to turn-on.

Subsequently, the controller may detect a face from an image captured by the camera module 200 in step 307. In an exemplary embodiment of the present invention, the face may be detected based on technologies such as facial recognition, iris scan, lariat feature tracking, etc. Further, in an exemplary embodiment of the present invention, the face detection is achieved by applying the foregoing technology to an image of a subject (e.g., face of the user) internally transferred through the camera module 200, and may include an operation for recognizing a location of two user eyes through an iris location tracking of the user from the detected image.

Next, the controller 500 may determine a view mode based on a result of the face detection in step 309. For example, the controller 500 may recognize the locations of the eyes of the user to determine agreement or disagreement with respect to an orientation of the eyes of the user, and determine a view mode corresponding to the orientation of the eyes of the user. An example of the operation will be described with reference to FIGS. 4 and 5 below.

Subsequently, the controller 500 may control the display of screen data according to the determined view mode in step 311. For example, the controller 500 may rotate or maintain and display a currently displayed screen data according to the determined view mode.

Figure 4:
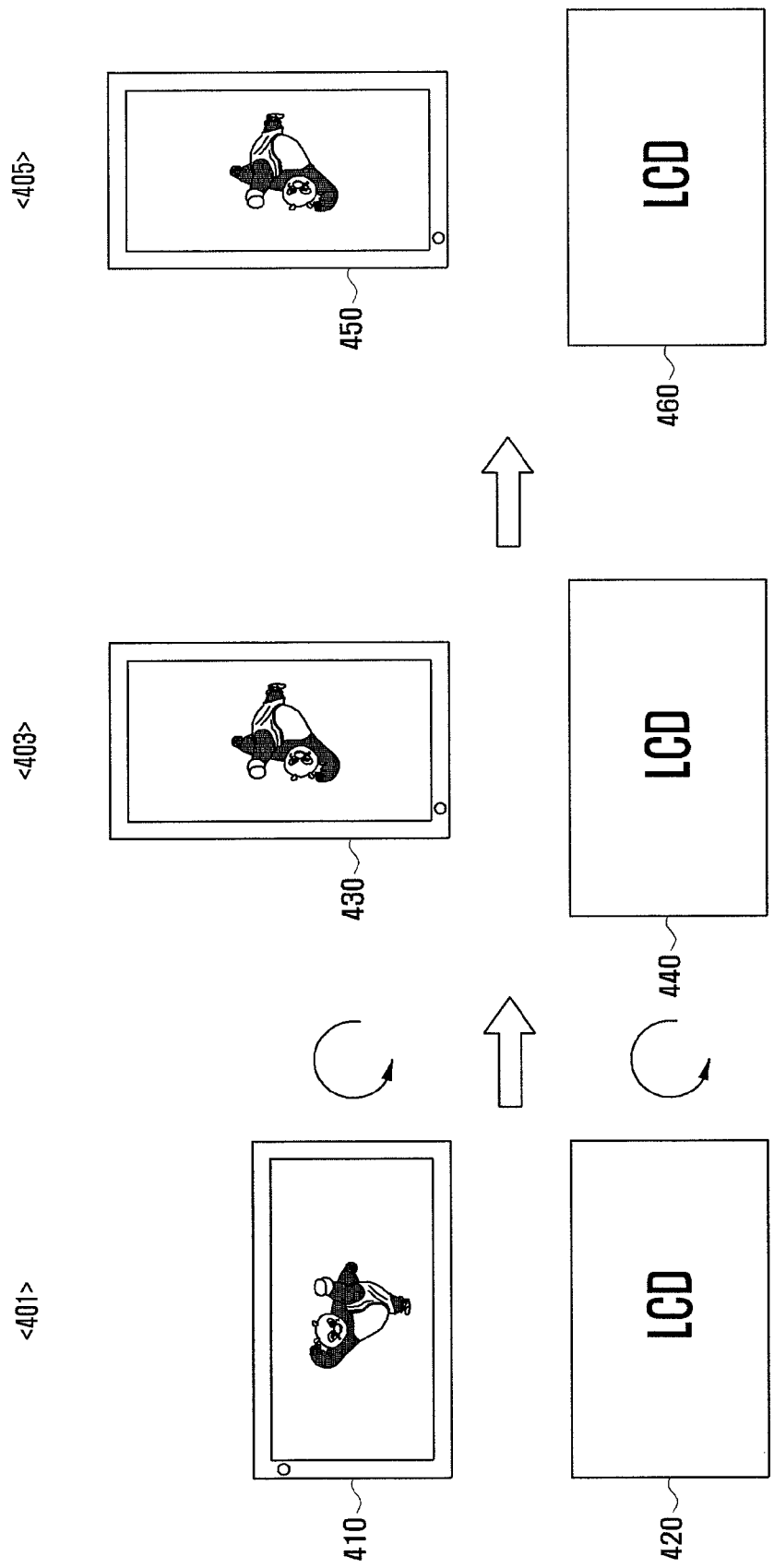
FIGS. 4 and 5 are views illustrating examples of an operation according to a view mode operation of a portable terminal according to an exemplary embodiment of the present invention.
Figure 5:
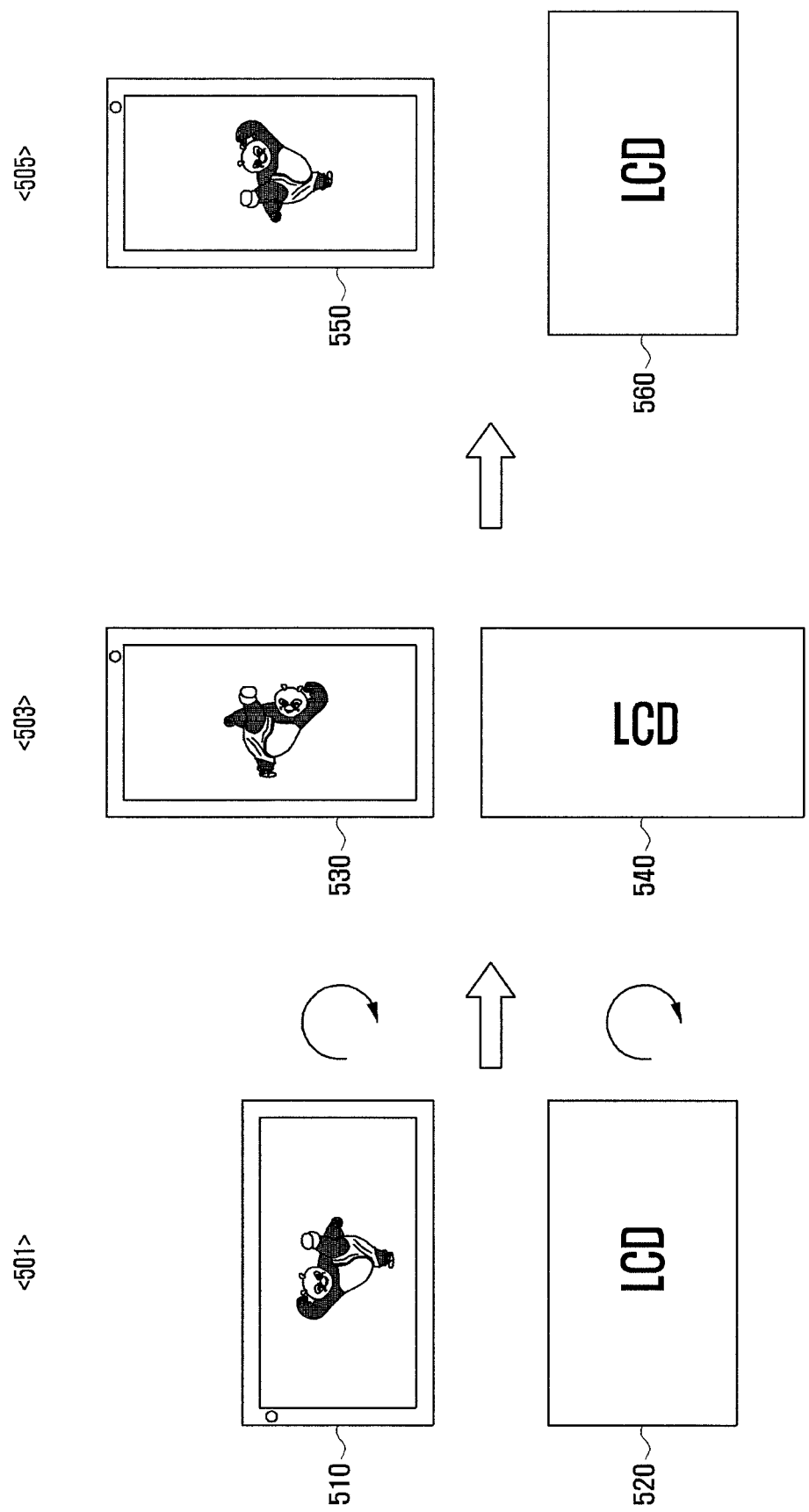

FIGS. 4 and 5 are views illustrating examples of an operation according to a view mode operation of a portable terminal according to an exemplary embodiment of the present invention. In particular, FIG. 4 illustrates an example where the user and the portable terminal are simultaneously rotated (e.g., the user lies horizontally). FIG. 5 illustrates an example where only the portable terminal is rotated while the eyes of the user remain in a fixed state.

Referring to FIGS. 4 and 5, reference numeral 410, reference numeral 430, and reference numeral 450 of FIG. 4, reference numeral 510, reference numeral 530, and reference numeral 550 of FIG. 5 indicate examples on which screen data are displayed on the display unit 300 of the portable terminal Reference numeral 420, reference numeral 440, and reference numeral 460 of FIG. 4, reference numeral 520, reference numeral 540, and reference numeral 560 of FIG. 5 indicate an orientation of the eyes of the user facing the portable terminal (particularly, display unit 300).

Referring to FIG. 4, as illustrated in reference numeral 401, it is assumed that screen data is displayed in a landscape view mode in a state in which the portable terminal is horizontally oriented, and an orientation of eyes of the user are such that the user views the portable terminal in a landscape view mode. In the foregoing state, as illustrated in reference numeral 403, the user lies horizontally and rotates the portable terminal in a counterclockwise direction. In this case, an orientation of eyes of the user is maintained in a landscape view mode as illustrated in reference numeral 440. Accordingly, although an orientation change event occurs, the portable terminal does not directly rotate screen data, and, as illustrated in reference numeral 405, continuously maintains a previous landscape view mode without rotation of the screen data as illustrated in reference numeral 450 in consideration of an orientation of the eyes of the user 460. That is, when a view mode before the orientation change of the portable terminal agrees with a view mode after the orientation change of the portable terminal, the portable terminal does not create a rotation event and may maintain a current view mode. For example, when the user lies horizontally to use the portable terminal, the user vertically views the portable terminal because a mode which the user wants to view would not correspond to a change based on a gravity direction alone, and thus a problem of inappropriately changing to a landscape view mode may be addressed. As illustrated previously, in an exemplary embodiment of the present invention, although a gravity direction disagrees with an orientation of eyes of the user, the orientation of the eyes of the user is detected using a camera module 200, and change in a screen view mode may be determined while simultaneously considering the gravity direction and the orientation of the eyes.

Referring to FIG. 5, it is assumed that screen data are displayed in a landscape view mode in a state where a portable terminal is oriented horizontally as illustrated in reference numeral 501, and an orientation of the eyes of the user is such that the portable terminal is viewed in a landscape view mode. In the foregoing state, as illustrated in reference numeral 503, a change in orientation of the user may cause the portable terminal to rotate in a clockwise direction while the orientation of the eyes of user remain in a fixed state. In this case, according to the rotation from the horizontal orientation to the vertical orientation, as illustrated in reference numeral 540, an orientation of the eyes of the user in which the user views the portable terminal faces from an upward direction to a downward direction. Accordingly, when the orientation change event occurs, the portable terminal changes a view mode from a landscape view mode to a transverse view mode as illustrated in reference numeral 505 considering an orientation of the eyes of the user and accordingly rotates and displays the rotated screen data. That is, an orientation of user eyes according to a view mode before the change in orientation of the portable terminal disagrees with that according to a view mode after the change in orientation of the portable terminal, and thus the portable terminal creates the rotation event and accordingly changes the view mode and rotates the screen data. For example, when the portable terminal is rotated in a state where an orientation of the user is fixed, an orientation of the user eyes is detected using a camera module 200, and a change in the screen view mode may be determined in consideration of both of the gravity direction and the orientation of the eyes.

As illustrated in FIGS. 4 and 5, in an exemplary embodiment of the present invention, when a change in the gravity direction is detected by the orientation change detector 100, the camera module 200 (particularly, front camera module) may be turned-on. Further, an orientation of user eyes (e.g., based on the locations of two eyes) may be recognized by face detection from an image input by the camera module 200. Next, it may be determined whether the gravity direction corresponds to an orientation of the eyes of the user to change the mode to a view mode corresponding to the orientation of eyes of the user, thereby minimizing inconvenience of the user due to a change in a view mode in which the orientation of the eyes of user is not considered.

Figure 6:
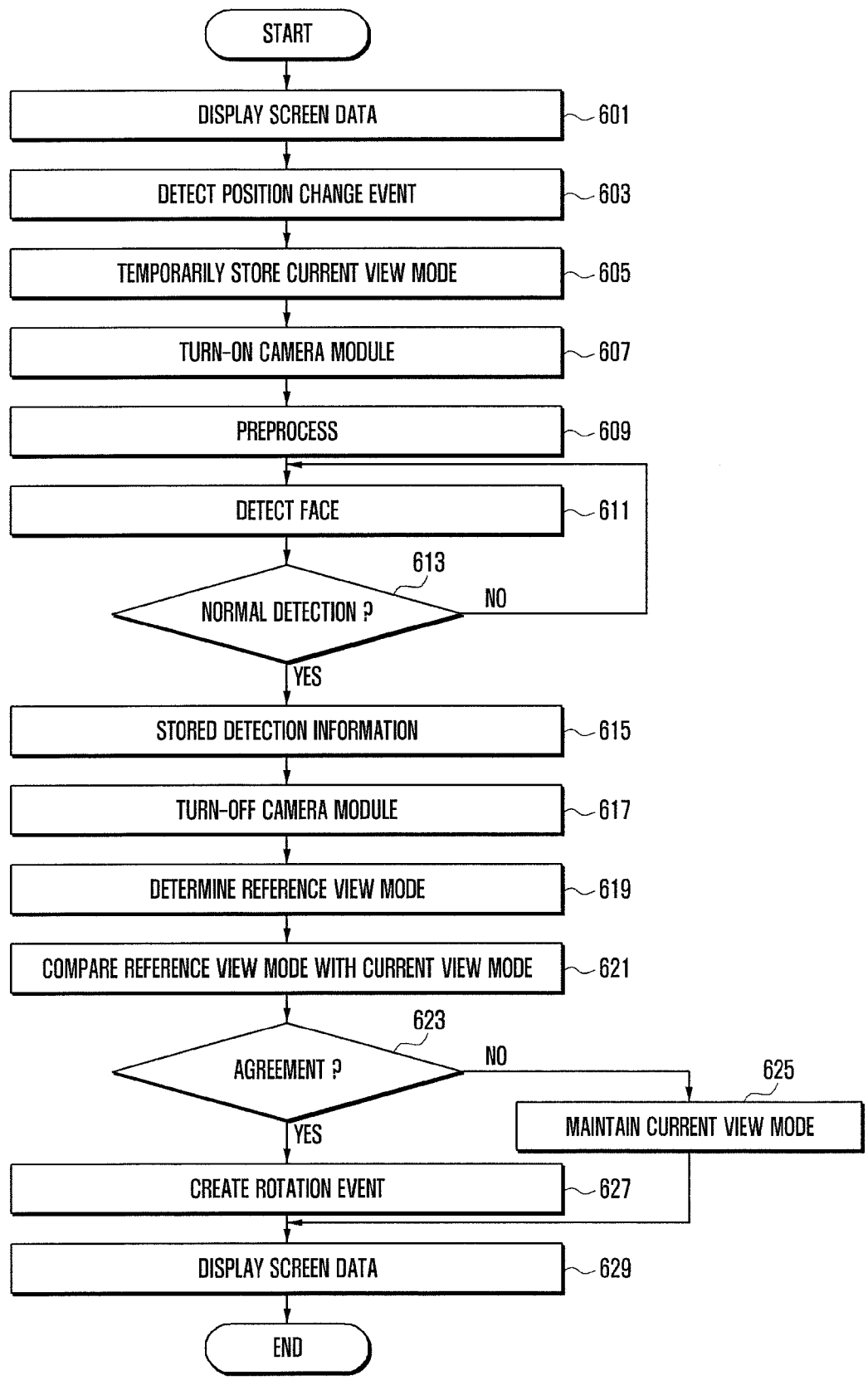
FIG. 6 is a flowchart illustrating a detailed control method for a view mode operation in a portable terminal according to an exemplary embodiment of the present invention.

FIG. 6 is a flowchart illustrating a detailed control method for a view mode operation in a portable terminal according to an exemplary embodiment of the present invention.

Referring to FIG. 6, a controller 500 may control the display of screen data in step 601. For example, the controller 500 may control the display of execution screen data of an application according to selection of the user and screen data such as a home screen or menus.

Next, the controller 500 may detect an orientation change event of a portable terminal in a display state of the screen data in step 603. In an exemplary embodiment of the present invention, the orientation change event may indicate an event used for change of a landscape view mode or a transverse view mode according to a gravity change detected by the orientation detector 100 while the portable terminal displays screen data as described above.

Next, if the orientation change event is detected, the controller 500 may temporarily store a current view mode in step 605. For example, if the orientation change event is detected, when the orientation change event is detected by the orientation detector 100, the controller 500 may determine whether a view mode displayed on the screen data is a landscape view mode or a transverse view mode, and store the determined view mode in the memory 400. Next, the controller 500 may control turning-on of the camera module 200, particularly, a front camera module, according to the orientation change event in step 607. In this case, if the orientation change event is detected, the controller 500 checks a state of the camera module 200. If the camera module 200 is turned-off, the controller 500 controls to turn-on the camera module 200. When the camera module 200 is turned-on, the controller 500 may directly perform the following operations. For example, when the portable terminal performs a function using a front camera module, such as a video phone call function, the front camera module may be in an on state.

Subsequently, the controller 500 may selectively perform preprocessing for an image provided through the camera module 200 in step 609. For example, because the user is located at a dark environment, an image (e.g., a preview image) captured by the camera module 200 may be dark. Accordingly, the controller 500 may control a first compensation (e.g., a scheme for reducing a frame rate to increase exposure) with respect to a preview image of the camera module 200 as described above. Further, when the image is dark after the first compensation, the controller 500 may acquire an average value using a histogram, and compare the image with the acquired average value. Next, the controller 500 may add a predetermined value to one or more pixels of the image that are less than the average value to control a second compensation for compensating brightness.

Subsequently, the controller 500 may detect a face from an image captured by the camera module 200 in step 611. In particular, the controller 500 may detect the face using the preprocessed image as described above. In an exemplary embodiment of the present invention, the face detecting method may use face color detection, and location detection of the eyes and lips.

Next, the controller 500 may determine whether face detection (particularly, the location of eyes) may be normally performed from the image in step 613. For example, the controller 500 may determine whether a location of the eyes of the user from the image is normally detected. Next, when the face detection is not normally performed (i.e., NO in step 613), the controller 500 may again perform the face detection procedure in step 611. For example, when the face detection is not normally performed from the image, that is, the location of the face (particularly, the location of the eyes) cannot be recognized, the controller 500 again performs face detection for the image (i.e., the preview image) captured by the camera module 200 or again a new image is captured by the camera module 200 to again detect the face.

Next, when the face detection is normally performed (i.e., YES in 613), the controller 500 may temporarily store detection information (e.g., the location of eyes) according the face detection in step 615, and control the camera module 200 to turn-off in step 617.

Then, the controller 500 may determine a reference view mode in step 619. For example, the controller 500 may recognize a location of the eyes of the user according to the face detection described above, compare a connection line of the recognized two eyes of the user (i.e., an orientation of the eyes of the user) with a preset reference line (i.e., a line corresponding to an orientation of the portable terminal) to determine a reference view mode according to the eyes of the user based on a result of the comparison. The controller 500 may determine a horizontal orientation or a vertical orientation of the user based on the detection information stored in the face detection. That is, the controller 500 may determine the horizontal orientation or the vertical orientation based on the connection line of the location of the user eyes. For example, when the orientation of the eyes of the user is vertical as confirmed from an image (face) of a vertical reference by the camera module 200, a reference view mode may be determine by changing the current view mode.

Conversely, when the orientation of the eyes of the user is horizontal as confirmed from an image (face) of a vertical reference by the camera module 200, the reference view mode may be determined based on the current view mode. That is, as described above, when the orientation of the eyes of the user is detected, the controller 500 determines the current view mode as the reference view mode if the angle (slope) of the connection line is less than a reference angle (e.g., 45°). When the angle (slope) of the connection line is equal to or greater than the reference angle (e.g., 45°), the controller 500 may change the current view mode (e.g., from landscape view mode to transverse view mode), and determine the changed view mode as the reference view mode. For example, the controller 500 compares the connection line of two user eyes with a reference line based on a horizontal line corresponding to the orientation of the portable terminal. When the angle (slope) of the connection line is less than 45°, the controller 500 determines the current view mode as the reference view mode. The controller 500 compares the connection line of the two eyes of the user with a reference line based on a horizontal line corresponding to the orientation of the portable terminal When the angle (slope) of the connection line is equal to or greater than 45°, the controller 500 changes a current view mode and determines the current view mode as the reference view mode.

Next, the controller 500 may compare the determined reference view mode with a temporarily stored current view mode in step 621, and determine whether there is an agreement thereof in step 623. Although not shown in FIG. 6, in an exemplary embodiment of the present invention, after determining whether there is an agreement thereof, the controller 500 may delete the temporarily stored current view mode and detection information or may delete the temporarily stored current view mode and detection information.

Next, when the reference view mode disagrees with the current view mode (i.e., NO in step 623), the controller 500 may maintain a current view mode without creation of a rotation event in step 625. Conversely, when the reference view mode agrees with the current view mode (i.e., YES in step 623), the controller 500 creates the rotation event in step 627, and rotates and displays the screen data based on a view mode according the rotation event in step 629. An example of the operation will be illustrated with reference to FIGS. 7 and 8.

Figure 7:
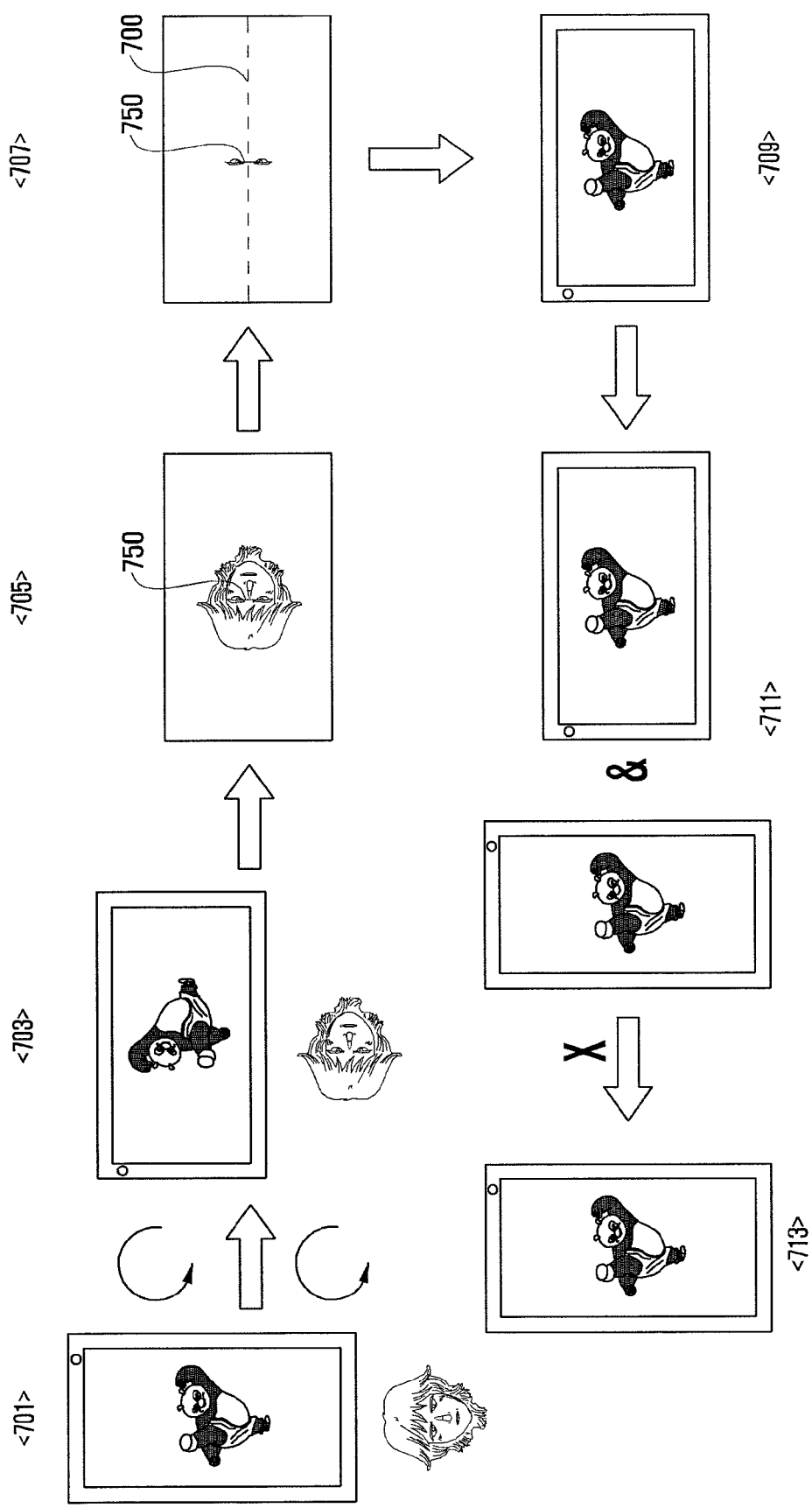
FIGS. 7 and 8 are views illustrating examples of a detailed operation according to a view mode operation of a portable terminal according to an exemplary embodiment of the present invention.
Figure 8:
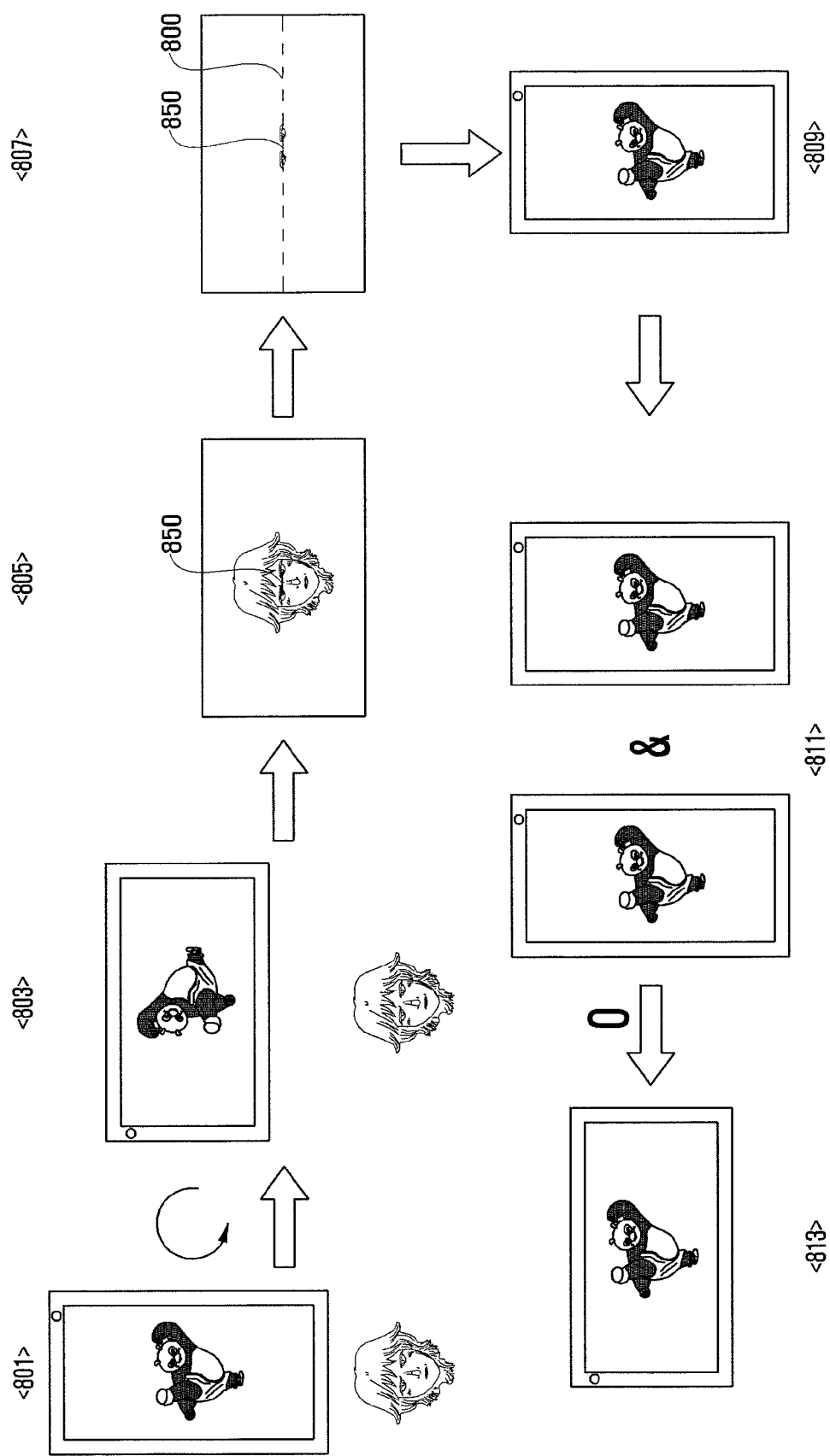

FIGS. 7 and 8 are views illustrating examples of a detailed operation according to a view mode operation of a portable terminal according to an exemplary embodiment of the present invention. Particularly, FIG. 7 illustrates an example where a user in an operation of FIG. 6 and the portable terminal are simultaneously rotated, and FIG. 8 illustrates an example where only a portable terminal is rotated while the eyes of the user remain in a fixed state.

Referring to FIG. 7, as illustrated in reference numeral 701, it is assumed that the user views the screen data in a transverse view mode. In a state of the reference numeral 701, as illustrated in reference numeral 703, the user may be rotated counterclockwise together with the portable terminal. For example, the user which was sitting upright, lies horizontally while using the portable terminal, and simultaneously rotates the portable terminal. In this case, the controller 500 may detect an orientation change event of the portable terminal to turn-on the camera module 200. Further, the controller 500 may recognize the eyes of the user through face detection using an image input through the camera module 200. The example is illustrated in reference numeral 705.

Moreover, as illustrated in reference numeral 707, the controller 500 may determine an angle (slope) of a connection line 750 of two eyes of the user. In this case, as illustrated in reference numeral 707, an angle of the connection line 750 is greater than the reference line 700 by 45° (e.g., 90°). Accordingly, the controller 500 recognizes that an angle (slope) of the connection line 750 is greater than the reference line 700 by 45°, and changes the current view mode (i.e., transverse view mode), and determines the changed view mode (i.e., landscape view mode) as the reference view mode as illustrated in reference numeral 709.

Next, the controller 500 may compare the current view mode with the reference view mode to determine whether there is an agreement thereof In this case, as illustrated in reference numeral 711, the current view mode differs from the reference view mode. Accordingly, as illustrated in reference numeral 713, the controller 500 may display the screen data while maintaining the current view mode as illustrated in reference numeral 701 at it is.

Referring to FIG. 8, as shown in reference numeral 801, it is assumed that the user views the screen data in the transverse view mode. In a state of reference numeral 801, as shown in reference numeral 803, the user may rotate only the portable terminal. For example, the user may rotate the portable terminal counterclockwise while using the portable terminal with sitting in an upright position. In this case, the controller 500 may sense the orientation change event of the portable terminal to turn-on the camera module 200. Further, the controller 500 may recognize the eyes of the user through face detection using an image input through the camera module 200. This exemplary embodiment is illustrated in reference numeral 805.

Furthermore, the controller 500 may determine an angle (slope) of a connection line 850 of the two recognized eyes of the user as illustrated in reference numeral 807. In this case, as illustrated in reference numeral 807, an angle between the connection line 850 and the reference line 800 is less than 45° (e.g., 0°. Accordingly, the controller 500 may recognize that the angle (slope) between the connection line 850 and the reference line 800 is less than 45° and maintain the current view mode (i.e., transverse view mode), and determine the current view mode (i.e., transverse view mode) as the reference view mode as illustrated in reference numeral 809.

Next, the controller 500 compares the current view mode with the reference view mode as illustrated in reference numeral 811 and determines whether there is an agreement thereof In this case, as illustrated in reference numeral 811, the current view mode agrees with the reference view mode. Accordingly, as illustrated in reference numeral 813, the controller 500 may change a current view mode (i.e., transverse view mode) as illustrated in reference numeral 801, and express the screen data in the changed view mode (i.e., landscape view mode).

Meanwhile, a method for displaying a view mode using face recognition of the present invention may be implemented using executable program commands readable by at least one processor and recorded in a non-transitory computer readable recording medium. In this case, the non-transitory computer readable recording medium may include program commands, a data file, and a data structure individually or a combination thereof. In the meantime, the program commands recorded in the non-transitory computer readable recording medium may be specially designed or configured for the present invention or be known to a person having ordinary skill in a computer software field to be used.

The non-transitory computer readable recording medium may be a magnetic media such as hard disk, floppy disk, or magnetic tape, optical media such as Compact Disc Read Only Memory (CD-ROM) or Digital Versatile Disc (DVD), magneto-optical media such as floptical disk, and a hardware device such as Read Only Memory (ROM), Random Access Memory (RAM), flash memory storing and executing program commands. Further, the program commands may include a machine language code created by a complier and a high-level language code executable by at least one processor and/or a computer using an interpreter. The foregoing hardware device may be configured to be operated using at least one software module to perform an operation of the present invention, and vice versa.

As illustrated previously, according to a method and an apparatus for displaying a view mode using face recognition of exemplary embodiments of the present invention, when the user lies horizontally and uses a portable terminal, as a view mode that the user wants to view does not correspond with gravity direction, the exemplary embodiments of present invention may address inconvenience in which a mode is automatically changed to a view mode disagreeing with an orientation of the eyes of the user.

Exemplary embodiments of the present invention determine a change in a screen data view mode in consideration of a gravity direction detected in the portable terminal and an orientation of the eyes of the user to minimize inconvenience of the user due to a change in a view mode.

In exemplary embodiments of the present invention, a camera mode is turned-on only when a change in orientation of a portable terminal is detected by the orientation detector, and a camera module is turned-off during determination of the view mode to minimize current consumption due to operation of an automatic change function of the portable terminal.

The view mode operation function of the portable terminal may be implemented in portable terminals of various forms and various devices corresponding thereto. As described above, exemplary embodiments of the present invention may implement an optimal environment for supporting a view mode operation function. Accordingly, in the exemplary embodiments of the present invention, a view mode is automatically operated according to an orientation of the eyes of the user in the portable terminal to enhance convenience for the user and utilization and competitive force of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying screen data according to determination of a view mode in a portable terminal, the method comprising:
   detecting an orientation change event of the portable terminal in a displayed state of the screen data;
   storing a current view mode when the orientation change event is detected;
   turning-on a camera module when the orientation change event is detected;
   determining an orientation of eyes of a user through face detection from an image captured by the camera module;
   determining a view mode of the portable terminal according to an orientation of the portable terminal and the orientation of the eyes of the user by determining a reference view mode and comparing the current view mode with the determined reference view mode; and
   displaying screen data according to the determined view mode.

2. The method of claim 1, wherein the image captured by the camera module is captured while maintaining the display of the screen data.

3. The method of claim 2, wherein the determining of the orientation of the eyes of the user comprises:
   preprocessing the image captured by the camera module after turning-on the camera module; and
   detecting a face from the preprocessed image.

4. The method of claim 3, further comprising:
   storing detection information according to the face detection; and
   turning-off the camera module.

5. The method of claim 4, wherein the determining of the view mode of the portable terminal comprises determining a view mode corresponding to an orientation of the eyes of the user according to one of an agreement and a disagreement between a gravity direction according to the orientation change of the portable terminal and the orientation of the eyes of the user according to the detection information.

6. The method of claim 1, wherein the displaying of the screen data comprises:
   maintaining the current view mode when the current view mode disagrees with the reference view mode; and
   creating a rotation event when the current view mode agrees with the reference view mode and rotating and displaying the screen data based on a view mode changed according to the rotation event.

7. The method of claim 3, wherein the determining of the orientation of the eyes of a user comprises:

recognizing a location of the eyes of the user according to the face detection; and determining the orientation of the eyes of the user based on a connection line between the two recognized eyes of the user.

8. The method of claim 7, wherein the determining of the reference view mode comprises determining the reference view mode according to the orientation of the eyes of the user based on comparison of the connection line between the two recognized eyes of the user with a certain reference line.

9. The method of claim 8, wherein the determining of the reference view mode comprises:

comparing the connection line of the two recognized eyes of the user with the reference line based on a horizontal line corresponding to the orientation of the portable terminal;

determining a current view mode as the reference view mode when an angle of the connection line is less than a reference angle; and changing the current view and determining the changed view mode as the reference view mode when the angle of the connection line is equal to or greater than the reference angle.

10. At least one non-transitory computer readable recording medium for storing a program commands configured to be readable by at least one processor for instructing the at least one processor to execute a computer process for performing the method as recited in claim 1.

11. A portable terminal comprising:

an orientation detector for detecting a change in orientation of the portable terminal and providing a corresponding orientation change event;

a camera module turned-on when the orientation change event occurs for capturing a user image;

a display unit for displaying screen data of the portable terminal in one of a landscape view mode and a transverse view mode;

a memory for storing a current view mode created during an operation of a view mode of the portable terminal and detection information; and a controller for controlling the camera module to turn-on when the orientation change event is detected in a displayed state of the screen data, for detecting a user face from an image captured by the camera module, for determining a reference view mode, for comparing the current view mode to the reference view mode, for determining a view mode corresponding to an orientation of the eyes of the user determined by the face detection, and for controlling to display the screen data on the display unit according to the determined view mode.

12. The portable terminal of claim 11, wherein the controller maintains a current view mode according to one of an agreement and a disagreement between a gravity direction and the orientation of the eyes of the user, or the controller changes the current view mode to another view mode.

13. The portable terminal of claim 12, wherein the controller comprises:

a camera controller for controlling the camera module to turn-on according to the orientation change event, and for controlling the camera module to turn-off when a view mode is determined;

a preprocessing module for compensating the image captured by the camera module;

a detector for detecting a face from the image captured by the camera module;

a calculator for recognizing a location of the eyes of the user according to the face detection, and for determining a reference view mode according to the orientation of the eyes of the user based on a comparison of the connection line between the two recognized eyes of user with a certain reference line; and a determinator for comparing a stored current view mode with the determined reference view mode, and for one of maintaining a current view mode according to an agreement thereof, and determining to change the view mode by creation of a rotation event according to a disagreement thereof.

14. The portable terminal of claim 13, wherein the calculator compares the connection line of the two eyes of the user with a reference line based on a horizontal line corresponding to the orientation of the portable terminal when the location of the eyes of the user is detected, determines a current view mode as a reference view mode when an angle of the connection line is less than a reference angle, and changes the current view mode when the angle of the connection line is equal to or greater than the reference angle and determines the changed view mode as the reference view mode.

* * * * *